(12) United States Patent
Song et al.

(10) Patent No.: US 10,814,824 B2
(45) Date of Patent: Oct. 27, 2020

(54) SIDE AIRBAG DEVICE

(71) Applicant: HYUNDAI MOBIS CO., LTD., Seoul (KR)

(72) Inventors: Jiwoon Song, Yongin-si (KR); Sang Won Hwangbo, Goyang-si (KR); Hae Kwon Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 175 days.

(21) Appl. No.: 16/128,395

(22) Filed: Sep. 11, 2018

(65) Prior Publication Data

US 2019/0092270 A1     Mar. 28, 2019

(30) Foreign Application Priority Data

Sep. 27, 2017   (KR) ........................ 10-2017-0125099

(51) Int. Cl.
| | |
|---|---|
| *B60R 21/2338* | (2011.01) |
| *B60R 21/207* | (2006.01) |
| *B60R 21/231* | (2011.01) |
| *B60R 21/233* | (2006.01) |

(52) U.S. Cl.
CPC ........ *B60R 21/2338* (2013.01); *B60R 21/207* (2013.01); *B60R 21/233* (2013.01); *B60R 21/23138* (2013.01); *B60R 2021/23146* (2013.01); *B60R 2021/23316* (2013.01); *B60R 2021/23386* (2013.01)

(58) Field of Classification Search
CPC .............. B60R 21/2338; B60R 21/233; B60R 21/23138; B60R 21/207; B60R 2021/23386; B60R 2021/23316; B60R 2021/23146
See application file for complete search history.

(56) References Cited

U.S. PATENT DOCUMENTS

| | | | | |
|---|---|---|---|---|
| 5,730,464 | A * | 3/1998 | Hill ................... | B60R 21/23138 |
| | | | | 280/730.2 |
| 6,010,149 | A * | 1/2000 | Riedel ................... | B60R 21/232 |
| | | | | 280/730.2 |
| 7,946,621 | B2 * | 5/2011 | Honda .................. | B60R 21/207 |
| | | | | 280/729 |
| 9,114,776 | B2 * | 8/2015 | Thomas .............. | B60R 21/2338 |
| 2006/0131847 | A1 * | 6/2006 | Sato .................. | B60R 21/23138 |
| | | | | 280/730.2 |
| 2008/0185824 | A1 * | 8/2008 | Sato .................. | B60R 21/23138 |
| | | | | 280/730.2 |

(Continued)

*Primary Examiner* — Frank B Vanaman
(74) *Attorney, Agent, or Firm* — Knobbe Martens Olson & Bear LLP (57) ABSTRACT

A side airbag device may include: an inflator mounted to a seat frame; a cushion unit covering the inflator and configured to be deployed by gas discharged from the inflator to protect a side portion of an occupant; and a tether unit mounted to the inflator and configured to enclose the cushion unit. The cushion unit may include: a cushion deployment part mounted to the inflator and configured to be deployed by gas discharged from the inflator; a cushion passing part formed in the cushion deployment part so that the tether unit passes through the cushion passing part; and a cushion penetration part formed in an upper end of the cushion deployment part so that the tether unit penetrates the cushion penetration part.

6 Claims, 5 Drawing Sheets

(56) References Cited

U.S. PATENT DOCUMENTS

2012/0049498 A1\* 3/2012 Wiik ................. B60R 21/23138
　　　　　　　　　　　　　　　　　　　　　280/743.2
2015/0343985 A1\* 12/2015 Sugimoto ............. B60R 21/207
　　　　　　　　　　　　　　　　　　　　　280/730.2
2018/0118150 A1\* 5/2018 Kwon ................... B60R 21/207

\* cited by examiner

SIDE AIRBAG DEVICE

CROSS-REFERENCES TO RELATED APPLICATIONS

The present application claims priority to Korean application number 10-2017-0125099, filed on Sep. 27, 2017, which is incorporated by reference in its entirety.

BACKGROUND OF THE INVENTION

The present invention relates to a side airbag device, and more particularly, to a side airbag device capable of preventing collision between occupants, and protecting an occupant even when only the single occupant sits on a seat.

In general, a side airbag protects a side portion of an occupant. In other words, when a vehicle is involved in an accident, an airbag cushion is inflated by supplied gas, and the inflated airbag cushion protects, by cushioning, an occupant who moves sideways.

Side airbags are classified into a near side airbag which is deployed between an occupant and a door to protect the occupant when a side collision occurs, and a far side airbag configured to restrain movement of the occupant who moves toward the inside of the vehicle due to reaction force generated by the side collision.

The far side airbag is required to be retained at a predetermined position after having inflated, so as to prevent a collision between occupants, particularly, a collision between the heads of the occupants.

In the conventional art, although the far side airbag may be effectively used in the case where two occupants sit on seats, it may not effectively protect an occupant in the case where only the single occupant sits on a seat. Therefore, there is a need to improve this configuration.

SUMMARY OF THE INVENTION

Embodiments of the present invention are directed to an airbag apparatus capable of preventing a collision between occupants, and also protecting an occupant even when only the single occupant sits on a seat.

In one embodiment, a side airbag device may include: an inflator mounted to a seat frame; a cushion unit covering the inflator and configured to be deployed by gas discharged from the inflator to protect a side portion of an occupant; and a tether unit mounted to the inflator and configured to enclose the cushion unit and reduce collision energy of the occupant. The cushion unit may include: a cushion deployment part mounted to the inflator and configured to be deployed by gas discharged from the inflator; a cushion passing part formed in the cushion deployment part so that the tether unit passes through the cushion passing part; and a cushion penetration part formed in an upper end of the cushion deployment part so that the tether unit penetrates the cushion penetration part.

The inflator may include: a discharge unit configured to provide gas when a vehicle collision occurs; and a mounting unit configured to mount the discharge unit to the seat frame.

The cushion passing part may include: a passage joining part formed in the cushion deployment part and configured to induce the cushion deployment part to be bent; and a passing hole formed in the passage joining part so that the tether unit passes through the passing hole.

A length of the passage joining part may be greater than a sum of a linear distance from opposite ends of the passage joining part to corresponding ends of the cushion deployment unit.

The cushion passing part may further include a pair of passing guides formed facing each other in a longitudinal direction of the passage joining part and configured to define a point at which the passage joining part is bent.

The pair of passing guides may protrude outward from the passage joining part.

The cushion penetration part may include: a penetration joining part formed in the upper end of the cushion deployment part and having a joined structure to prevent gas from being drawn thereinto; and a penetration hole formed in the penetration joining part so that the tether unit passes through the penetration hole.

The tether unit may include: a first tether fixed to the inflator, and reaching the cushion passing part; a second tether extending from the first tether, and reaching the cushion penetration part via the cushion passing part; and a third tether extending from the second tether, and fixed to the inflator via the cushion penetration unit.

In a side airbag device in accordance with the present invention, a tether unit formed to enclose a cushion unit may reduce collision energy of an occupant.

In the side airbag device in accordance with the present invention, the tether unit may enclose the cushion unit while passing through the cushion unit, and may induce an upper portion of the cushion unit to be inclined toward the occupant.

In the side airbag device in accordance with the present invention, when a vehicle collision occurs, the head of the occupant comes into contact with the tether unit so that impact may be absorbed, and the tether unit may slide by the head of the occupant and induce the upper portion of the cushion unit to enclose the head of the occupant.

DESCRIPTION OF SPECIFIC EMBODIMENTS

Hereinafter, an embodiment of a side airbag apparatus in accordance with the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
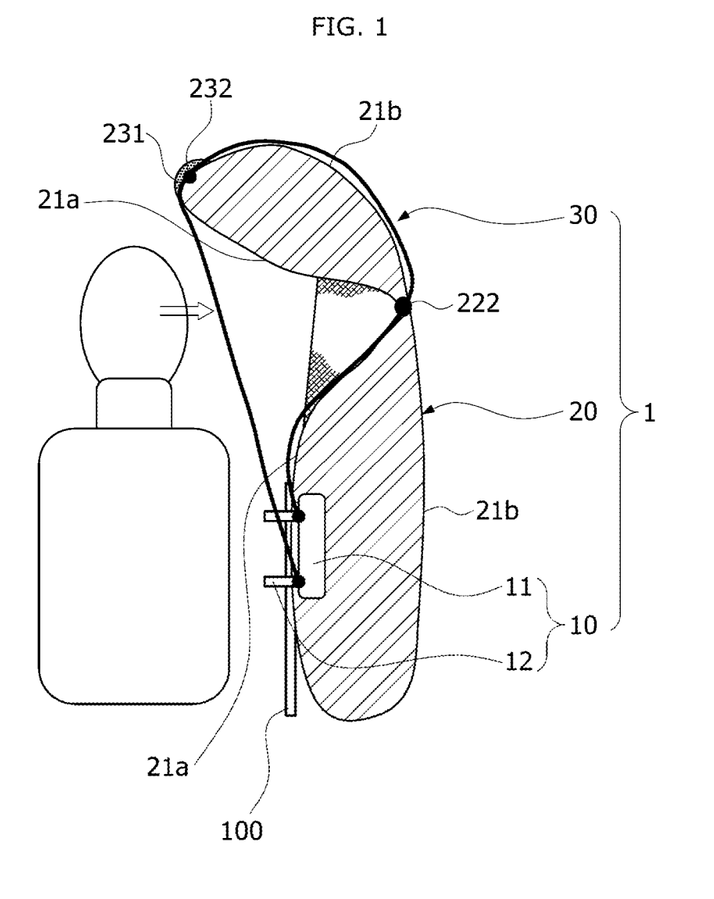
FIG. 1 is a diagram schematically illustrating a side airbag device in accordance with an embodiment of the present invention.

FIG. 1 is a diagram schematically illustrating a side airbag device in accordance with an embodiment of the present invention. Referring to FIG. 1, the side airbag device 1 in accordance with the embodiment of the present invention includes an inflator 10, a cushion unit 20, and a tether unit 30.

The inflator 10 is mounted on a seat frame 100. For example, the seat frame 100 may be made of metal and covered with a seat cushion to allow an occupant to sit thereon. A vehicle includes various seats such as a driver's seat and a passenger seat. The inflator 10 may be installed on each of the seat frames 100 corresponding to the respective seats. Alternatively, the inflator 10 may be selectively installed.

The cushion unit 20 covers the inflator 10, and may be deployed by gas discharged from the inflator so as to protect a side portion of the occupant. For example, the cushion unit 20 coupled to the inflator 10 may be folded and housed in the seat cushion before gas is discharged from the inflator 10, and may be deployed when gas is discharged from the inflator 10, and then protrude out of the seat cushion.

The tether unit 30 may be mounted to the inflator 10 and formed to enclose the cushion unit 20, and may function to reduce collision energy of the occupant. For example, opposite ends of the tether unit 30 may be fixed to the inflator 10. The tether unit 30 may be formed to enclose an outer surface of the cushion unit 20, and may function to guide the cushion unit 20 such that an upper part of the cushion unit 20 encloses the head of the occupant.

The inflator 10 in accordance with the embodiment of the present invention includes a discharge unit 11 and a mounting unit 12.

The discharge unit 11 provides gas when a vehicle collision occurs. For example, when a vehicle collision is sensed, a sensing signal is transmitted to the discharge unit 11 so that gas is discharged from the discharge unit 11.

The mounting unit 12 mounts the discharge unit 11 to the seat frame 100. For example, a plurality of mounting units 12 may be coupled to the seat frame 100 by bolting to fix the discharge unit 11 to the seat frame 100.

Figure 2:
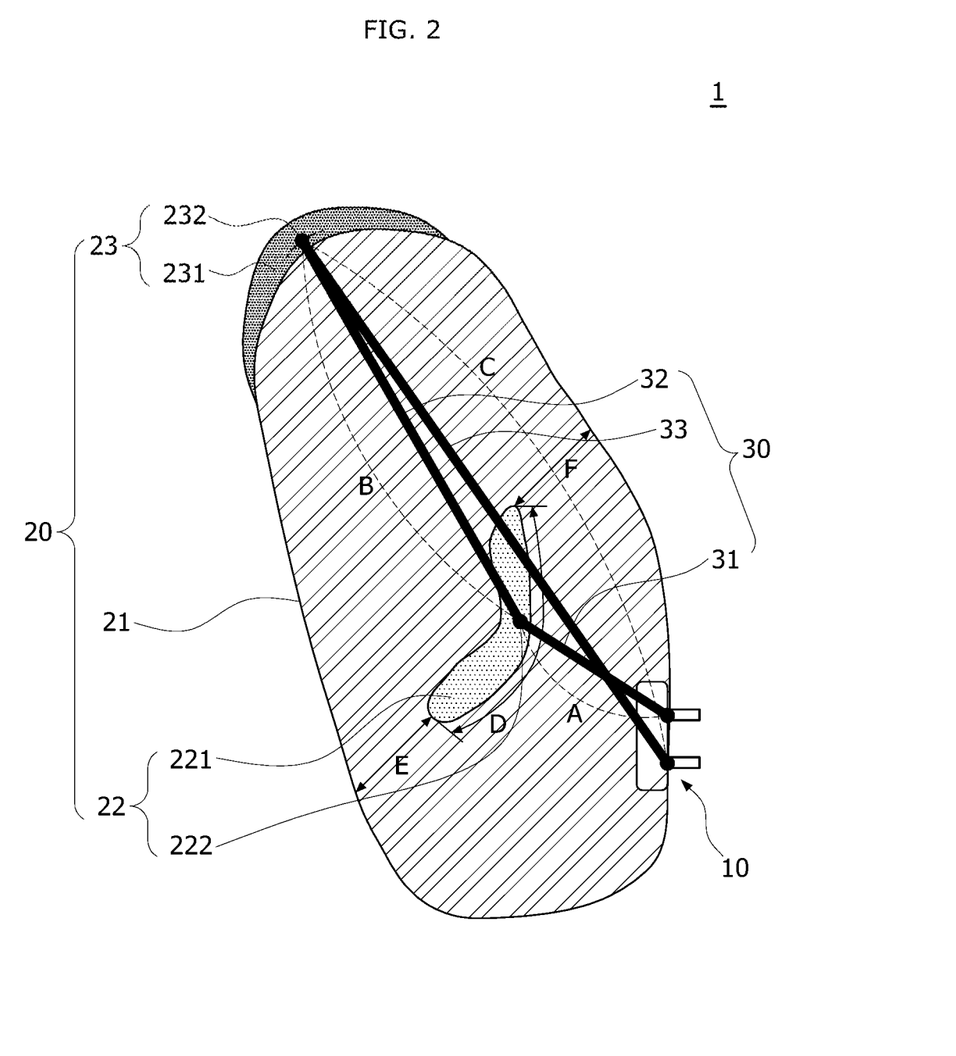
FIG. 2 is a diagram schematically illustrating a deployed state of a cushion unit of the side airbag device in accordance with the embodiment of the present invention.
Figure 3:
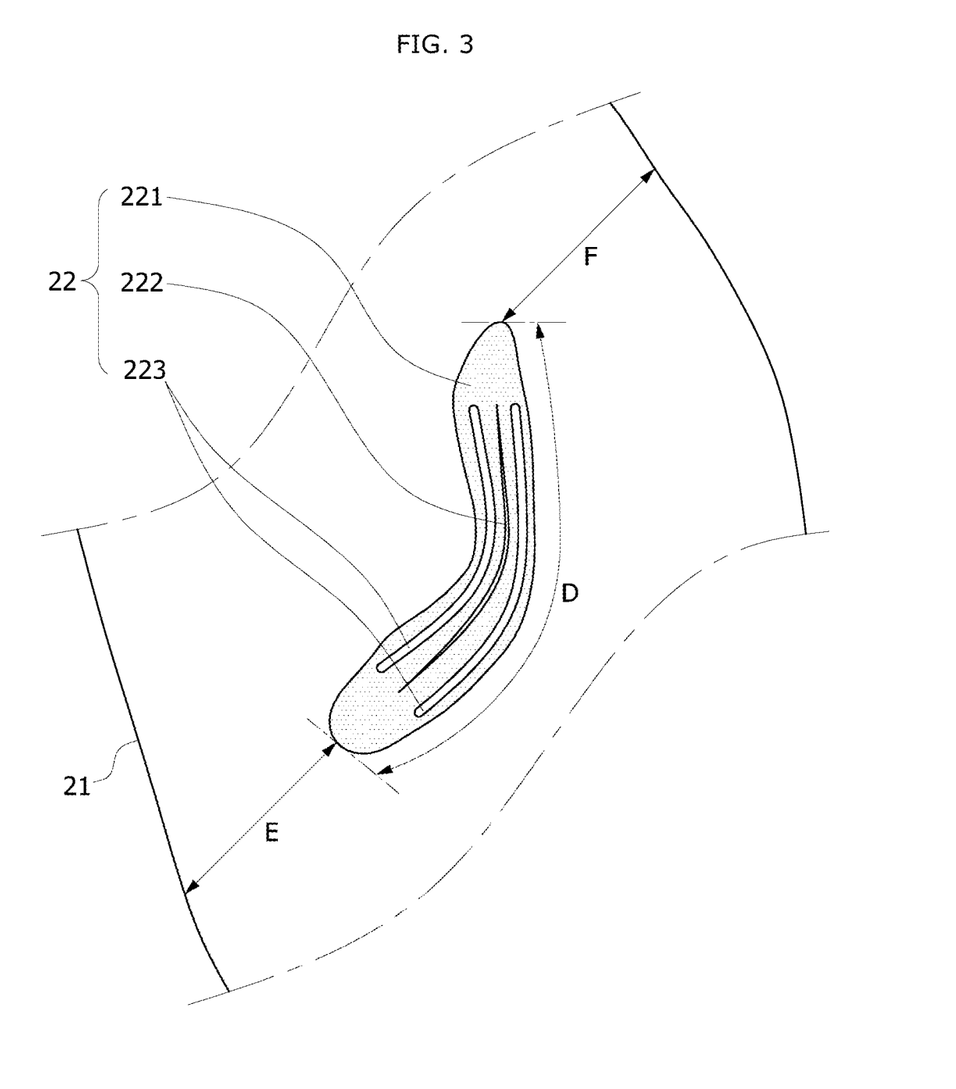
FIG. 3 is a diagram schematically illustrating a cushion passing part of the side airbag device in accordance with the embodiment of the present invention.

FIG. 2 is a diagram schematically illustrating a deployed state of the cushion unit of the side airbag device in accordance with the embodiment of the present invention, and FIG. 3 is a diagram schematically illustrating a cushion passing part of the side airbag device in accordance with the embodiment of the present invention.

Referring to FIGS. 1 to 3, the cushion unit 20 in accordance with the embodiment of the present invention includes a cushion deployment part 21, a cushion passing part 22, and a cushion penetration part 23.

The cushion deployment part 21 is mounted to the inflator 10, and may be deployed by gas discharged from the inflator 10 and then disposed on a side of the occupant. For example, the cushion deployment unit 21 may be coupled to the discharge unit 11 and configured to be deployed. In addition, the cushion deployment unit 21 may be coupled to the seat frame 100 and configured to be deployed. When the cushion deployment unit 21 is deployed, the cushion deployment unit 21 may be divided into an inner side surface 21a facing the occupant, and an outer side surface 21b disposed on an opposite side of the inner side surface 21a.

The cushion passing part 22 is formed in the cushion deployment part 21, and the tether unit 30 passes through the cushion passing part 22. For example, the cushion passing part 22 may be disposed at a position corresponding to the head of the occupant when the cushion deployment part 21 is completely deployed. The cushion deployment unit 21 formed from the cushion passing part 22 as a start point to an upper end of the cushion deployment part 21 may protrude to enclose the head of the occupant.

The cushion passing part 22 in accordance with the embodiment of the present invention includes a passage joining part 221 and a passing hole 222.

The passage joining part 221 is formed in the cushion deployment part 21 and induces the cushion deployment part 21 to bend. For example, the passage joining part 221 may mean a region in which some portions of the cushion deployment part 21 are joined with each other such that gas is not drawn into the region. The passage joining part 221 is disposed in a horizontal or inclined direction of the cushion deployment unit 21 so that an upper portion of the cushion deployment part 21 that is disposed over the passage joining part 221 can be inclined toward the occupant. The passage joining part 221 may be formed in an approximately linear or streamlined shape. In addition, the passage joining part 221 may have various shapes to make it possible for the cushion deployment part 21 to be bent on the passage joining part 221.

The passing hole 222 is formed in the passage joining part 221, and the tether unit 30 passes through the passing hole 222. For example, the passing hole 222 may have a slit shape. The tether unit 30 is disposed from the inner side surface 21a side of the cushion deployment part 21 to the outer side surface 21b side by passing through the passing hole 222.

The cushion passing part 22 in accordance with the embodiment of the present invention may further include a passing guide 223. In the present embodiment, a pair of passing guides 223 are formed facing each other in a longitudinal direction of the passage joining part 221 so as to define a point at which the passage joining part 221 is bent.

For example, the pair of passing guides 223 protrude outward from the passage joining part 221, and the passage joining part 221 may be bent on a portion thereof disposed between the passing guides 223. Thanks to the passing guides 223 described above, the passage joining part 221 may be bent on a selected point regardless of the size of the passage joining part 221.

The length of the passage joining part 221 is greater than the linear distance from opposite ends of the passage joining part 221 to corresponding ends of the cushion deployment unit 21. In more detail, when the length of the passage joining part 221 is designated as "D", a linear distance from one end of the passage joining part 221 to a corresponding end of the cushion deployment part 21 is designated as "E", and a linear distance from the other end of the passage joining part 221 to a corresponding end of the cushion deployment part 21 is designated as "F", D>E+F may be satisfied. Thereby, even though gas is injected into region E and region F, thanks to length D, the passage joining part 221 may rapidly react to external force and bend.

The cushion penetration part 23 is formed in the upper end of the cushion deployment part 21, and the tether unit 30 passes through the cushion penetration part 23. For example, the cushion penetration part 23 may include a penetration joining part 231 which is formed in the upper end of the cushion deployment part 21 and has a joined structure to prevent gas from being drawn thereinto, and a penetration hole 232 which is formed in the penetration joining part 231, and through which the tether unit 30 passes. The tether unit 30 is disposed from the outer side surface 21b side of the cushion deployment part 21 to the inner side surface 21a side by passing through the penetration hole 232.

Referring to FIGS. 1 to 3, the tether unit 30 in accordance with the embodiment of the present invention includes a first tether 31, a second tether 32, and a third tether 33. For example, the tether unit 30 may be formed of a single string, and include elastic material for shock absorption. Furthermore, the tether unit 30 may include soft material to prevent the occupant from being injured due to direct contact with the tether unit 30.

The first tether 31 is fixed to the inflator 10 and reaches the cushion passing part 22. The second tether 32 extends from the first tether 31, and reaches the cushion penetration part 23 via the cushion passing part 22. The third tether 33 extends from the second tether 32, and is fixed to the inflator 10 via the cushion penetration unit 23. The third tether 33 functions to support the occupant.

The first tether 31 may be coupled at one end thereof to the mounting unit 12, be disposed along the inner side surface 21a of the cushion deployment part 21, and reach the cushion passing part 22. The second tether 32 may pass through the cushion passing part 22 and be disposed along the outer side surface 21b of the cushion deployment part 21. The third tether 33 may pass through the cushion penetration part 23 and be disposed along the inner side surface 21a of the cushion deployment part 21. The third tether 33 may be coupled at one end thereof to the mounting unit 12.

The length of the tether unit 30 is less than that of an installation path of the tether unit 30 before the deployment of the cushion unit 20. In more detail, when the length of the tether unit 30 is L, the distance from the mounting unit 12 to the cushion passing part 22 is A, the distance from the cushion passing part 22 to the cushion penetration part 23 is B, and the distance from the cushion passing part 23 to the mounting unit 12 is C, A+B+C>L may be satisfied. Thereby, when the cushion deployment part 21 is completely deployed, the upper portion of the cushion deployment part 21 that is disposed over the cushion passing part 22 may be bent toward the occupant, and the tether unit 30 may be tensed.

Figure 4:
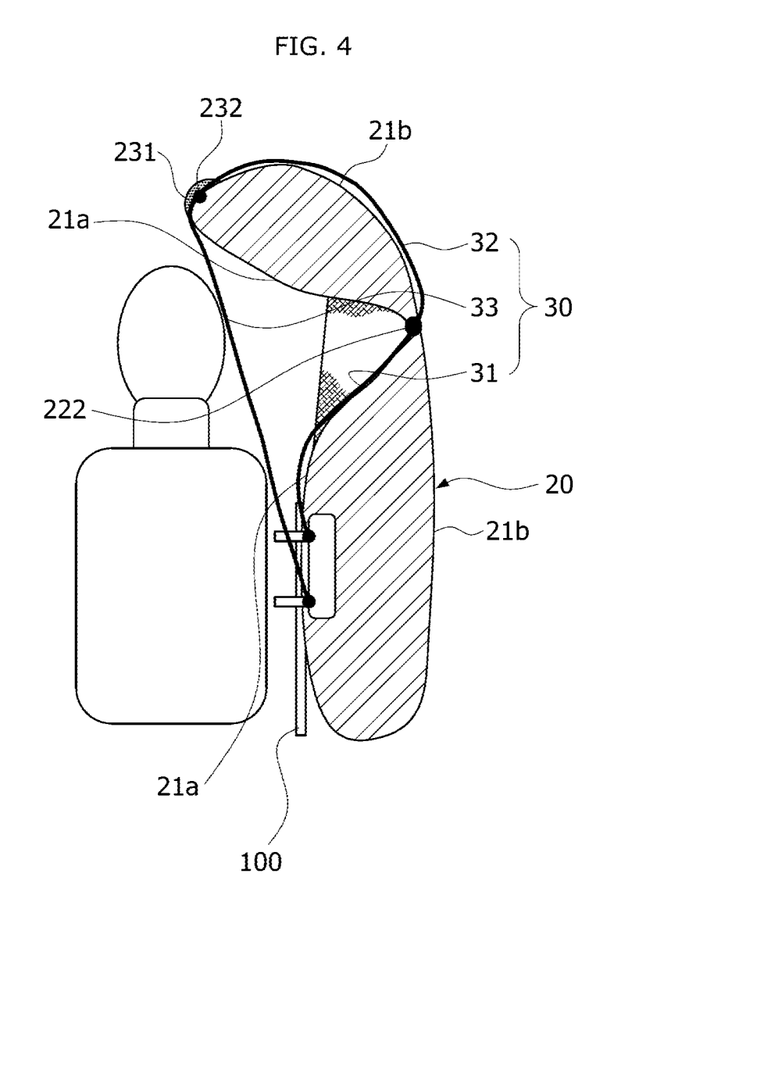
FIG. 4 is a diagram schematically illustrating a completely deployed shape of the cushion unit before an occupant is loaded on the side airbag device in accordance with the embodiment of the present invention.
Figure 5:
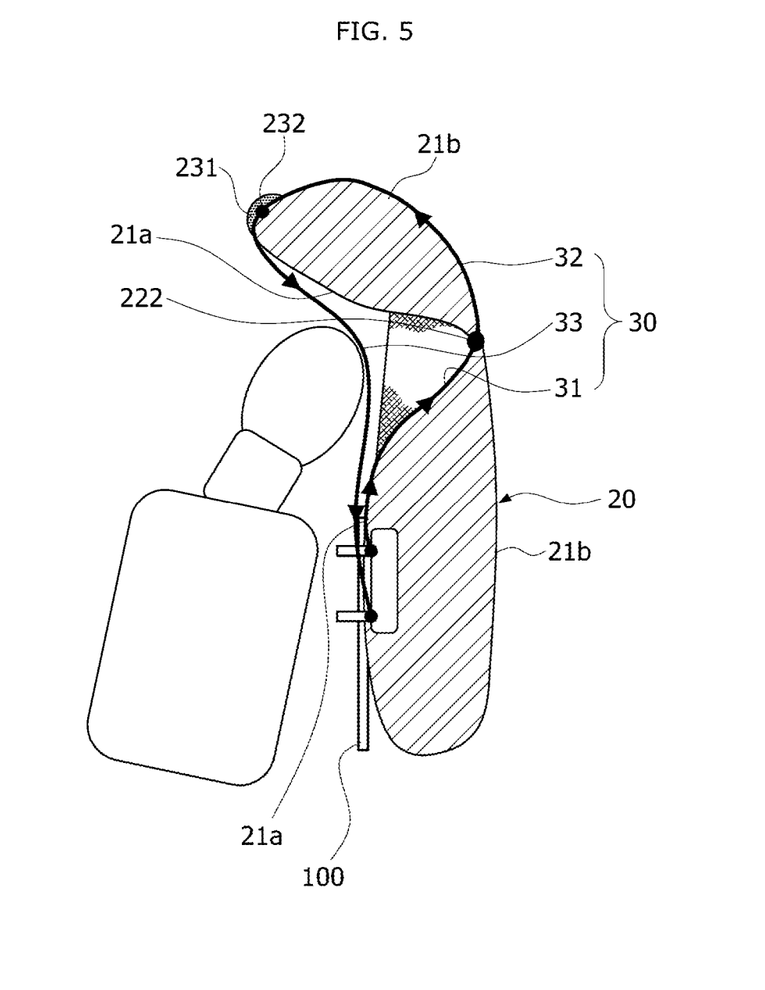
FIG. 5 is a diagram schematically illustrating an energy absorbing process when the occupant is loaded after the state of FIG. 4.

FIG. 4 is a diagram schematically illustrating a completely deployed shape of the cushion unit before the occupant is loaded on the side airbag device in accordance with the embodiment of the present invention, and FIG. 5 is a diagram schematically illustrating an energy absorbing process when the occupant is loaded after the state of FIG. 4. Hereinbelow, the operation of the side airbag device 1 will be described with reference to FIGS. 4 and 5.

If gas is discharged from the inflator 10 when a vehicle collision occurs, the cushion unit 20 is deployed. Here, the tether unit 30 passing through the cushion passing part 22 and the cushion penetration part 23 supports the circumference of the cushion deployment part 21. In detail, the first tether 31 is disposed on the inner side surface 21a of the cushion deployment part 21, the second tether 32 is disposed on the outer side surface 21b of the cushion deployment part 21, and the third tether 33 is disposed on the inner side surface 21a of the cushion deployment part 21. Due to the length of the tether unit 30, the upper end of the cushion deployment part 21 remains bent toward the head of the occupant (refer to FIG. 4).

In this state, if the occupant moves toward the cushion deployment part 21, the head of the occupant pushes the third tether 33. If the head of the occupant pushes the third tether 33, the entire tether unit 30 slides in a direction indicated by the arrows. As such, if the tether unit 30 slides, the tension applied to the tether unit 30 is increased, so that the upper end of the cushion deployment part 21 may be further inclined toward the occupant to enclose the head of the occupant. Thereby, the movement of the occupant may be controlled by an increased load, whereby displacement of the occupant may be effectively restrained. Particularly, since the cushion deployment part 21 encloses the head of the occupant, impact may be prevented from being applied to the head and the neck of the occupant.

As described above, in the side airbag device 1 in accordance with the embodiment of the present invention, the tether unit 30 is configured to enclose the cushion unit 20, whereby collision energy of the occupant may be markedly reduced.

Furthermore, in the side airbag device 1 in accordance with the embodiment of the present invention, the tether unit 30 encloses the cushion unit 20 while passing through the cushion unit 20, and thus is able to induce the upper portion of the cushion unit 20 to be bent toward the occupant.

In addition, in the side airbag device 1 in accordance with the embodiment of the present invention, when a vehicle collision occurs, the head of the occupant comes into contact with the tether unit 30 so that impact is absorbed, and the tether unit 30 slides by the head of the occupant and thus induces the upper portion of the cushion unit 20 to enclose the head of the occupant.

Although preferred embodiments of the invention have been disclosed for illustrative purposes, those skilled in the art will appreciate that various modifications, additions and substitutions are possible, without departing from the scope and spirit of the invention as defined in the accompanying claims. Therefore, the spirit and scope of the present invention should be defined by the accompanying claims.

What is claimed is:

1. A side airbag device comprising:
    an inflator mounted to a seat frame;
    a cushion unit covering the inflator and configured to be deployed by gas discharged from the inflator to protect a side portion of an occupant; and
    a tether unit mounted to the inflator and configured to enclose the cushion unit and reduce collision energy of the occupant,
    wherein the cushion unit comprises:
        a cushion deployment part mounted to the inflator and configured to be deployed by gas discharged from the inflator;
        a cushion passing part formed in the cushion deployment part so that the tether unit passes through the cushion passing part; and
        a cushion penetration part formed in an upper end of the cushion deployment part so that the tether unit penetrates the cushion penetration part,
    wherein the cushion passing part comprises:
        a passage joining part formed in the cushion deployment part and configured to induce the cushion deployment part to be bent, and
        a passing hole formed in the passage joining part so that the tether unit passes through the passing hole,
        wherein a length of the passage joining part is greater than a sum of a linear distance from opposite ends of the passage joining part to corresponding ends of the cushion deployment part.

2. The side airbag device according to claim 1, wherein the inflator comprises:
    a discharge unit configured to provide gas when a vehicle collision occurs; and
    a mounting unit configured to mount the discharge unit to the seat frame.

3. The side airbag device according to claim 1, wherein the cushion passing part further comprises a pair of passing guides formed facing each other in a longitudinal direction of the passage joining part and configured to define a point at which the passage joining part is bent.

4. The side airbag device according to claim 3, wherein the pair of passing guides protrude outward from the passage joining part.

5. The side airbag device according to claim 1, wherein the cushion penetration part comprises:
- a penetration joining part formed in the upper end of the cushion deployment part and having a joined structure to prevent gas from being drawn thereinto; and
- a penetration hole formed in the penetration joining part so that the tether unit passes through the penetration hole.

6. The side airbag device according to claim 1, wherein the tether unit comprises:
- a first tether fixed to the inflator, disposed on an inner side surface of the cushion deployment part, and reaching the cushion passing part;
- a second tether extending from the first tether, reaching the cushion penetration part via the cushion passing part, and disposed on an outer side surface of the cushion deployment part; and
- a third tether extending from the second tether, disposed on the inner side surface of the cushion deployment part, and fixed to the inflator via the cushion penetration part.

* * * * *